(12) United States Patent
Fromm

(10) Patent No.: US 8,757,901 B2
(45) Date of Patent: Jun. 24, 2014

(54) CAMERA STEADYING DEVICE

(71) Applicant: Wayne G. Fromm, Toronto (CA)

(72) Inventor: Wayne G. Fromm, Toronto (CA)

(*) Notice: Subject to any disclaimer, the term of this patent is extended or adjusted under 35 U.S.C. 154(b) by 0 days.

(21) Appl. No.: 13/672,459

(22) Filed: Dec. 12, 2012

(65) Prior Publication Data

US 2014/0003802 A1  Jan. 2, 2014

Related U.S. Application Data

(60) Provisional application No. 61/637,225, filed on Apr. 23, 2012.

(51) Int. Cl.
*G03B 17/00* (2006.01)
*G03B 17/56* (2006.01)

(52) U.S. Cl.
CPC .................................. *G03B 17/56* (2013.01)
USPC .......................................................... 396/428

(58) Field of Classification Search
CPC ........................................................ G03B 17/56
USPC .......................................................... 396/428
See application file for complete search history.

(56) References Cited

U.S. PATENT DOCUMENTS

| 7,684,694 | B2 | 3/2010 | Fromm | |
|---|---|---|---|---|
| 7,975,973 | B1* | 7/2011 | Weeden | 248/217.4 |
| 2008/0117328 | A1* | 5/2008 | Daoud et al. | 348/373 |
| 2009/0010637 | A1* | 1/2009 | DeWitt | 396/428 |
| 2009/0242723 | A1* | 10/2009 | Starcher | 248/460 |
| 2011/0116782 | A1* | 5/2011 | Scott | 396/428 |
| 2013/0004153 | A1* | 1/2013 | McKee et al. | 396/420 |

* cited by examiner

*Primary Examiner* — Clayton E Laballe
*Assistant Examiner* — Dennis Hancock
(74) *Attorney, Agent, or Firm* — John C. Thompson; Sandra J. Thompson

(57) ABSTRACT

The present invention relates to an elongated camera support which may extend between the hand of the user and the camera, and more particularly to such a camera support wherein a rubber-like bumper is provided adjacent the back of the camera to permit the user of the camera to place the camera against a wall or the like for support when taking pictures.

6 Claims, 6 Drawing Sheets

CAMERA STEADYING DEVICE

TECHNICAL FIELD

The present invention relates to a telescoping camera support of the type shown in U.S. Pat. No. 7,684,694, and more particularly to such a support which is provided with a friction surface or the like on the back of the camera attachment to permit the user to place the camera against a wall or the like for support when taking pictures.

BACKGROUND OF THE INVENTION

Several differing embodiments of a camera support are illustrated in U.S. Pat. No. 7,684,694. In the principal embodiment a camera is shown mounted on a base assembly, which is spaced away from a handgrip by an extensible assembly. It has been found that when the user is taking a self portrait the user is frequently straining to hold the camera upright and steady, particularly when a heavy camera is being supported, such as a camcorder or digital single lens reflex camera (DSLR) with a heavy lens. The forgoing patent shows differing embodiments where support may be provided. In one embodiment a tripod may be attached to the handgrip as shown in FIG. 20 of the patent, so that the whole assembly resembles a monopod. While this design is satisfactory in some situations, particularly indoors, in the field it is seldom satisfactory as it requires a level surface. In another design the handgrip is provided with a suction cup. In yet an alternate design a two-legged tripod is provided at the base assembly which supports the camera, this design being shown in FIG. 2 of the patent. While this design is satisfactory in many situation, it does not function well in some situations, particularly where there is only a vertical or near vertical surface which is near the user of the camera.

OBJECTS AND SUMMARY OF THE INVENTION

It is an object of this invention to provide a camera steadying device which can be employed with a camera support assembly of the type having an extensible support which extends between a camera base assembly and a handgrip. To this end a bumper or protective friction surface is added to the back of the camera attachment assembly, which allows the user to take self-portraits i) without straining to hold the camera upright, ii) without straining to hold the camera steady, iii) while protecting the back of the camera, iv) while protecting the support surface, and v) transferring at least a portion of the weight of the camera to the opposing support surface. Thus the camera steadying device of the present invention 1) provides a no shake, steady camera hold for the camera with virtually no set up time required, 2) protects the back of the camera (with a protruding bumper as shown), 3) protects the surface that is used for support (vehicle window, vehicle body, wall, tree, etc), and 4) bears the weight of the camera by the opposing support surface as it transfers it away from the person holding the apparatus.

The foregoing objects and other objects and advantages of this invention will become more apparent after a consideration of the following detailed description taken in conjunction with the accompanying drawings.

DETAILED DESCRIPTION

Figure 1:
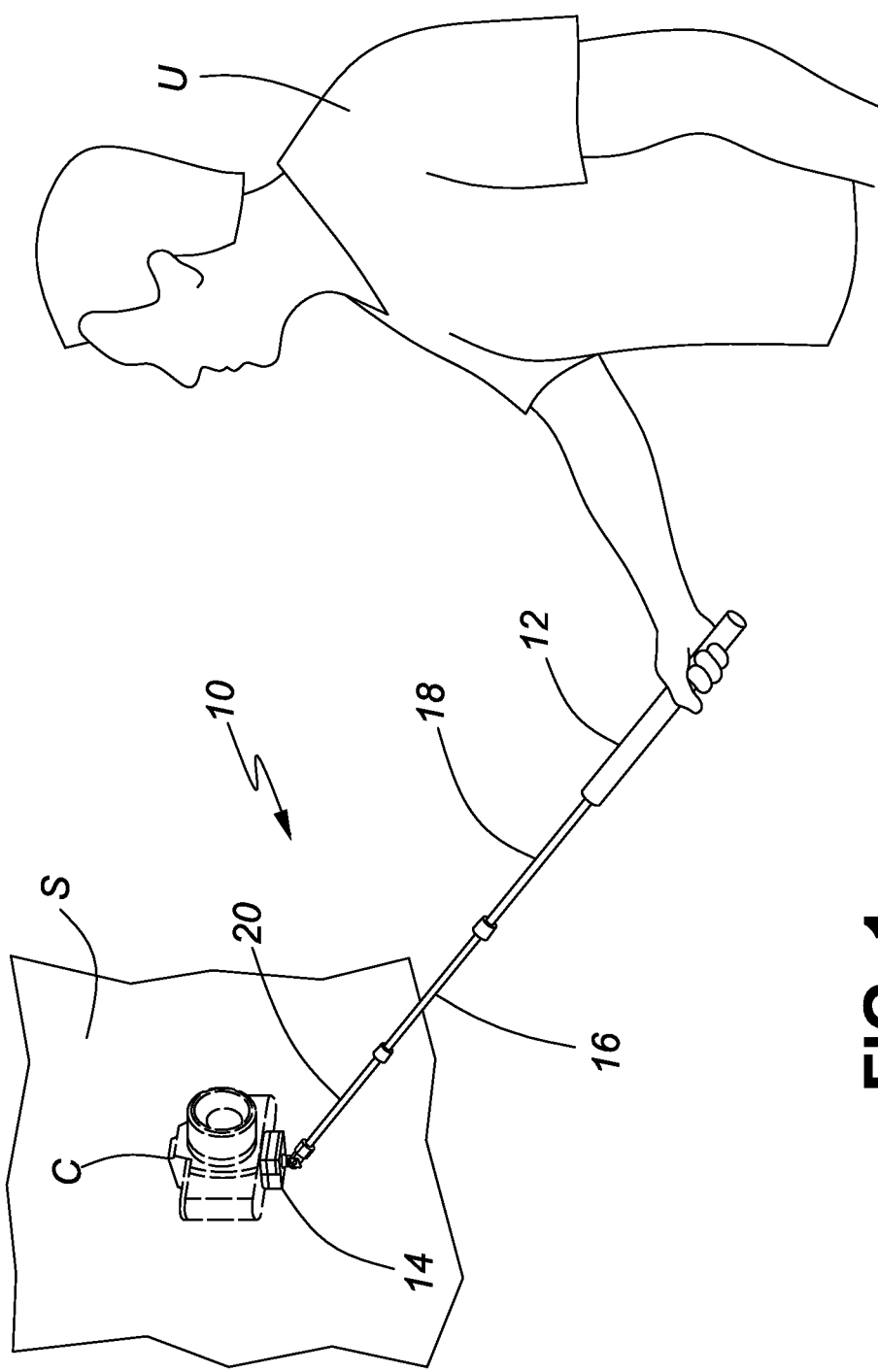
FIG. 1 shows a user of the camera steadying device, the device being placed against a vertical surface and the camera support being extended, the camera steadying device of this invention being attached to the camera support.

FIG. 1 shows a relatively heavy camera "C" carried by a camera support assembly indicated generally at 10. The camera support is more fully illustrated in applicant's U.S. Pat. No. 7,684,694, the subject matter of which is incorporated herein by reference thereto. As shown in FIG. 1 the camera support 10 includes a hand grip 12 being grasped by a user "U", a base assembly 14 and an elongated extensible support 16 having a segment 18 secured to the hand-grip 18, a second segment 20 secured to the base assembly 14, and an intermediate portion which extends between segments 18 and 20.

Figure 2:
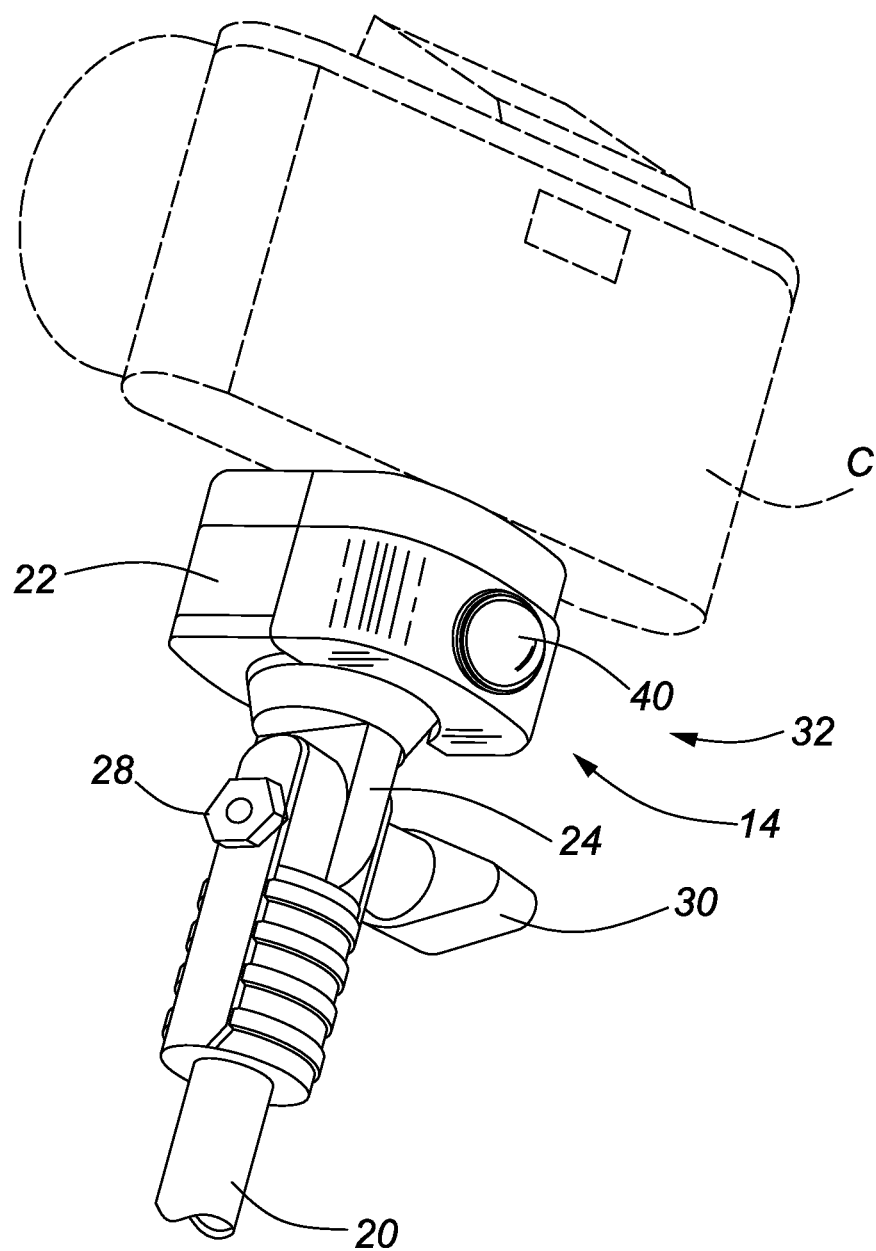
FIG. 2 shows a first embodiment of the camera steadying device of this invention mounted on the base assembly of a camera support, a camera (shown in phantom lines) being mounted on the camera steadying device.

The base assembly 14 may be of differing designs, some of which are illustrated in applicant's U.S. Pat. No. 7,684,694. A block design is shown in FIG. 2, which design include a block 22 provided with an apertured tongue 24. The tongue 24 is adjustably secured to a sleeve 26 which carries a locking device in the form of a nut 28 and a winged screw 30 which passes through the nut. The sleeve 26 receives the second support 20 and is secured thereto in any conventional manner.

Figure 3:
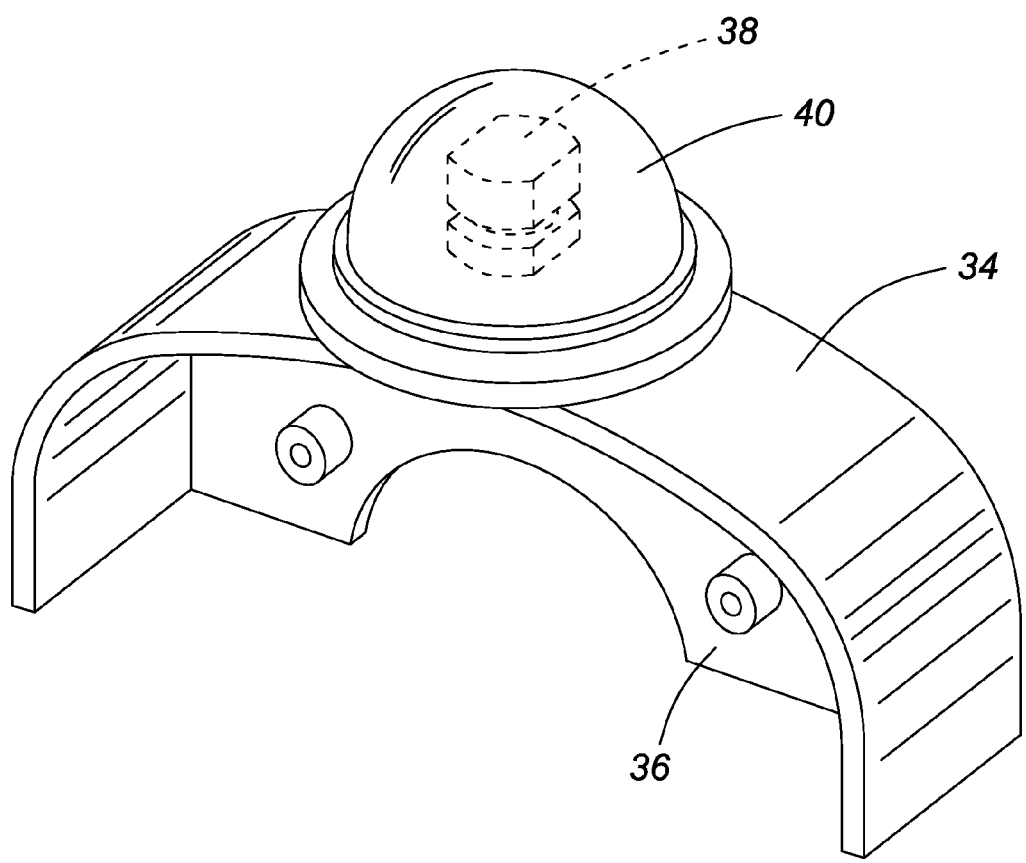
FIG. 3 shows a portion of the camera steadying device, this view illustrating a rubber bumper which may be snapped on a stud carried by support member of the camera steadying device.
Figure 4:
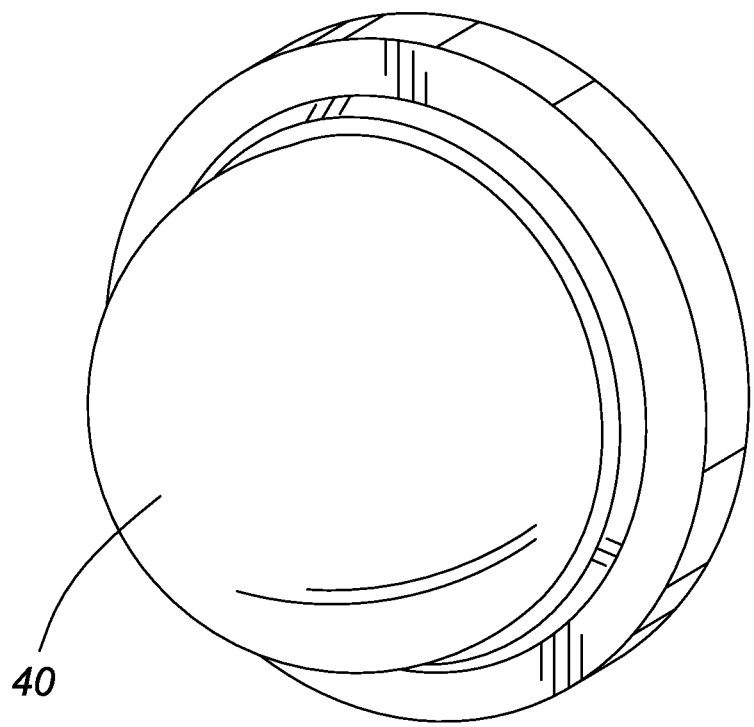
FIG. 4 is a view of the rubber bumper.

In order to provide support, particularly for heavy camera, a bumper assembly, indicated generally at 32, is provided on the back of the block 22. The bumper assembly 32 includes mounting means for mounting the bumper in the form of a generally U-shaped mounting bracket 34 having a web portion 36 which extends from one side of the U-shaped frame to the other side as best shown in FIG. 3, the web being located to one side of the bracket 34, for example the bottom as shown in FIG. 2. The U-shaped bracket can be secured in any conventional manner to the block 22, as for example by screws not shown. Centrally located on the U-shaped bracket is a mounting stud 38, and a rubber or rubber-like bumper is snap fit over the mounting stud. It can be seen from FIG. 1 that when the camera support is provided with a rubber bumper of the type shown in FIGS. 2-4 that a user has a steady mount for the camera when placed against a vertical surface "S" and does not have to strain to hold the camera.

A possible use is for news reporters using this device, with the addition of the new bumper in the future, to record themselves by leaning their photographic equipment against a news van window or body panel, for example. More particularly, this \could be a very useful device for news reporters videotaping themselves on assignment. They can hold the extendable hand-held camera apparatus in one head, grip the back head of the camera mount on a news vehicle window or panel, for example, and hold a microphone in their other hand while filming them self. All of this is done by one reporter thus saving the cost of a camera operator to accompany the reporter. Additionally, during natural disasters a reporter can brave a hurricane, for example, when a labor pool is scarce and operate his or her own photographic equipment without requiring the assistance of another person. A warning light may be built into the bumper and apparatus. Thus, when the photographer is using the extendable camera support with the camera steadying device of this invention it is possible that pedestrians can accidentally walk into the support. If the back bumper has a flashing or solid light this will serve as notice to pedestrians. While the warning light in the preferred embodiment would be placed on the bumper, it may be in other locations. For example, the entire rod could light up, the head assembly, and/or the bumper. Alternatively, the apparatus could have safety reflection coatings or adhesives that are reflective to warn pedestrians.

This rig will work well with lightweight cameras as well as heavy, professional equipment that would be too difficult to hold steady without the benefit of this bumper. The bumper illustrated had a rounded surface. This rounded surface allows the camera to stay firmly gripped at a vertical height yet permits adjustments in the pitch to be made. However, as noted above other designs may be desirable.

Figure 5:
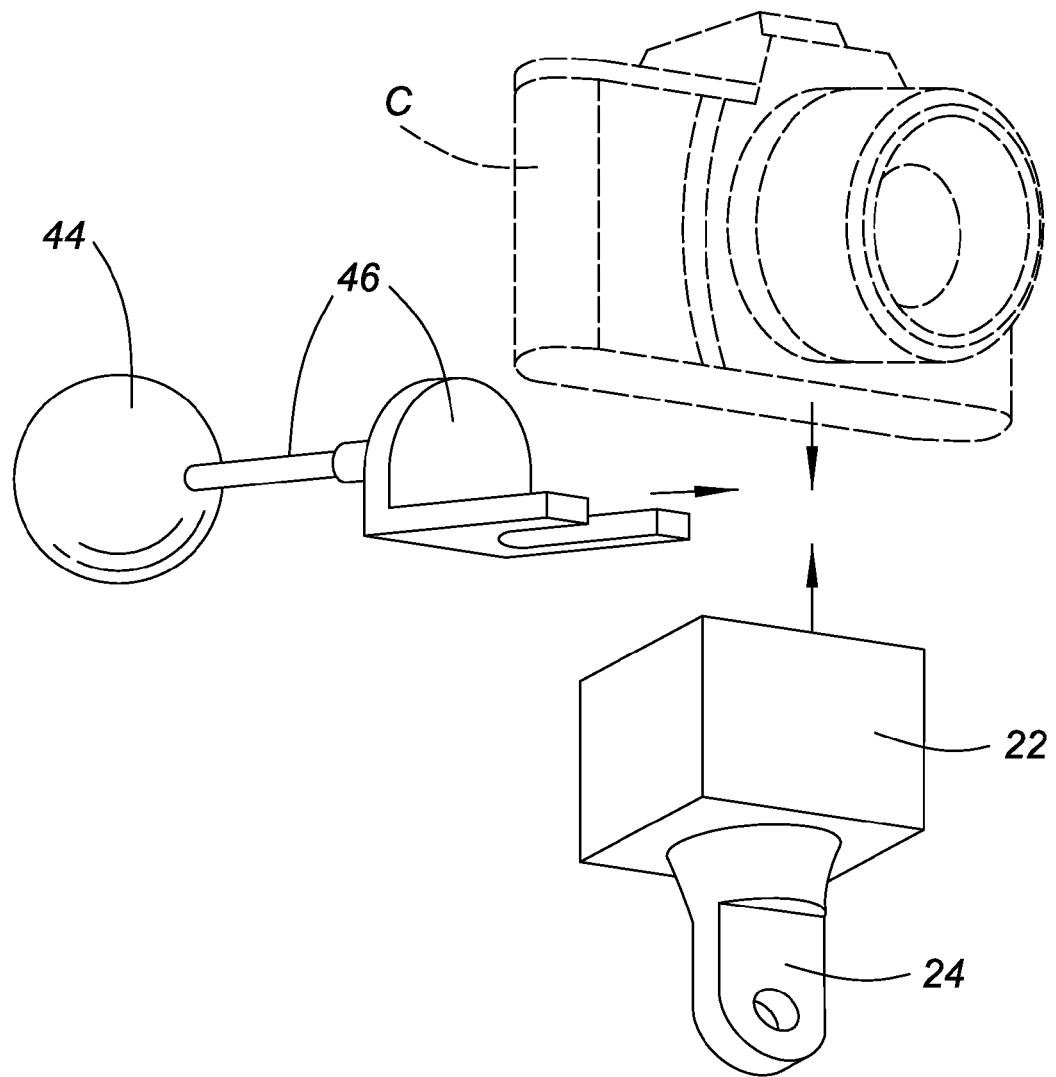
FIG. 5 is a view of a second embodiment where the rubber bumper is replaced by a rubber-like ball, which ball is supported by fork-like structure which may be received between a camera and the camera base assembly of the camera support.

Many differing forms may be employed. Basically anything that provides a grip or friction. The idea is to minimize the weight and/or distribute it away from the user and partially on to a support surface. Another design is shown in FIG. 5. In this design the rubber bumper is replaced by a rubber-like ball 44, which ball is supported by means for mounting the bumper in the form of a fork-like structure 46 which may be received between a camera "C" and the camera base assembly 14.

Figure 6:
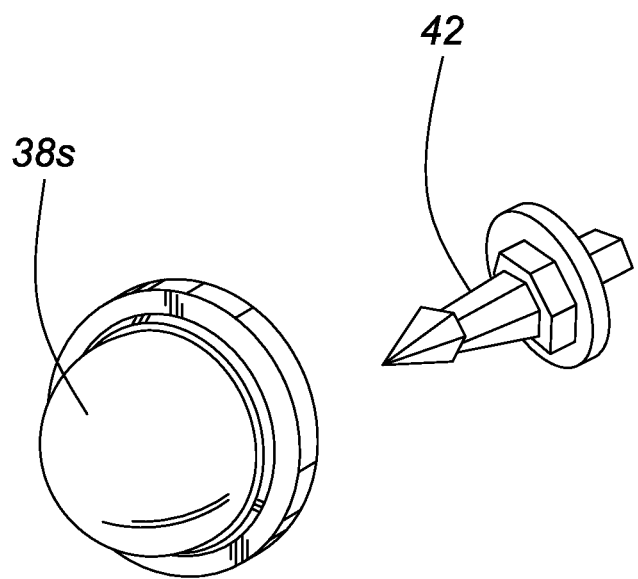
FIG. 6 is a view of a third embodiment where the stud of the of the first embodiment is replace by a spike.

On a totally irregular surface, like a tree trunk, an alternate design would be a spike with a sharpened tip to lean against the truck. Such as design is illustrated in FIG. 6 where the U-shaped mounting bracket 22 may be provided with a spike 42, which spike may also receive a rubber bumper 38s specifically configured to be received by the spike.

While not illustrated, another means for mounting the bumper may be a snap-on mounting bracket. Thus, a U-shaped mounting bracket could be made of spring steel, and it could be provided with projections which could be received in suitable recesses or groove on the block 22, the U-shaped mounting block also being provided with a stud 38 which could receive the bumper 40.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the terms as used in the claims are intended to include not only the designs illustrated in the drawings of this application and the equivalent designs discussed in the text, but are also intended to cover other equivalents now known to those skilled in the art, or those equivalents which may become known to those skilled in the art in the future.

What is claimed is:

1. A camera steadying device comprising:
an extensible support assembly including a handgrip which may be grasped by the user of the camera, a block which may receive a camera, and an elongated extensible support which extends between the handgrip and the block;
a rubber-like bumper having a rounded surface to permit pitch adjustments; and
means for mounting the bumper on the back of the block, which bumper may be placed against a vertical surface or near vertical surface near the user of the camera for steadying the camera when in use.

2. The camera steadying device as set forth in claim 1 wherein the means for mounting the bumper is a U-shaped mounting bracket carried by the back of the block at the end of the extensible support.

3. The camera steadying device as set forth in claim 2 wherein the U-shaped mounting bracket is provided with a stud which releasably receives the rubber-like bumper.

4. The camera steadying device as set forth in claim 2 wherein the U-shaped mounting bracket is provided with a spike which releasably receives the rubber-like bumper, which spike can be placed against a rough surface like a tree trunk when the rubber-like bumper is removed, the spike then steadying the assembly.

5. The camera steadying device as set forth in claim 1 wherein the means for mounting the bumper is a fork-like structure received between the block and the camera, and the rubber-like bumper is a rubber ball carried by an end of the fork-like structure.

6. An apparatus for supporting a camera comprising:
a base assembly which may be secured to a camera;
a handgrip; and
an elongated support which extends between the handgrip and the base assembly whereby a user of the apparatus may secure a camera to the base assembly and, while holding the handgrip, may adjustably position the camera a distance away greater than arms length to capture a still image or moving images;
characterized by
the base assembly being provided with a rubber-like bumper having a rounded surface so that the user of the camera can releasably position and steady the camera against a vertical or near vertical surface, the surface providing a support for the camera.

* * * * *